(12) United States Patent
Maresch (10) Patent No.: US 8,384,739 B2
(45) Date of Patent: Feb. 26, 2013

(54) SYSTEMS AND METHODS FOR OPTIMIZATION OF PIXEL-PROCESSING ALGORITHMS

(75) Inventor: Markus Maresch, Boulder, CO (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 921 days.

(21) Appl. No.: 12/286,651

(22) Filed: Sep. 30, 2008

(65) Prior Publication Data

US 2010/0080486 A1  Apr. 1, 2010

(51) Int. Cl.
G09G 5/02 (2006.01)
(52) U.S. Cl. .................. 345/629; 382/266; 358/1.18
(58) Field of Classification Search .......... 345/629; 382/266; 358/1.18
See application file for complete search history.

(56) References Cited

U.S. PATENT DOCUMENTS

| | | | | |
|---|---|---|---|---|
| 5,180,309 | A * | 1/1993 | Egnor | 434/323 |
| 5,465,307 | A * | 11/1995 | Azumaya et al. | 382/165 |
| 5,835,149 | A * | 11/1998 | Astle | 375/240.05 |
| 5,839,380 | A * | 11/1998 | Muto | 112/102.5 |
| 5,926,227 | A * | 7/1999 | Schoner et al. | 348/512 |
| 6,049,339 | A * | 4/2000 | Schiller et al. | 345/630 |
| 6,239,829 | B1 | 5/2001 | Curry | |
| 6,249,360 | B1 * | 6/2001 | Pollard et al. | 358/473 |
| 6,289,129 | B1 * | 9/2001 | Chen et al. | 382/232 |
| 6,400,467 | B1 * | 6/2002 | Harrington | 358/1.9 |
| 6,456,394 | B1 | 9/2002 | Gwaltney et al. | |
| 6,667,744 | B2 * | 12/2003 | Buckelew et al. | 345/502 |
| 7,340,097 | B2 * | 3/2008 | Kondo et al. | 382/190 |
| 7,382,494 | B2 | 6/2008 | McElvain | |
| 7,602,967 | B2 * | 10/2009 | Lim | 382/162 |
| 7,737,993 | B2 * | 6/2010 | Kaasila et al. | 345/613 |
| 7,876,971 | B2 * | 1/2011 | Gardella et al. | 382/254 |
| 2002/0050959 | A1 * | 5/2002 | Buckelew et al. | 345/55 |
| 2002/0076106 | A1 * | 6/2002 | Kondo et al. | 382/194 |
| 2004/0263909 | A1 | 12/2004 | McElvain | |
| 2005/0013502 | A1 * | 1/2005 | Lim | 382/254 |
| 2005/0104966 | A1 * | 5/2005 | Schoelkopf et al. | 348/207.11 |
| 2005/0160470 | A1 * | 7/2005 | Strauss | 725/115 |
| 2005/0195163 | A1 * | 9/2005 | Grewal et al. | 345/157 |
| 2006/0244756 | A1 * | 11/2006 | Rublee | 345/581 |
| 2007/0046821 | A1 * | 3/2007 | Mead et al. | 348/571 |
| 2007/0057955 | A1 * | 3/2007 | McKay | 345/550 |
| 2007/0121013 | A1 * | 5/2007 | Stanton | 348/624 |
| 2008/0007563 | A1 * | 1/2008 | Aronson et al. | 345/589 |
| 2008/0007752 | A1 * | 1/2008 | Gandhi et al. | 358/1.9 |
| 2008/0013125 | A1 * | 1/2008 | McElvain | 358/2.1 |
| 2009/0010493 | A1 * | 1/2009 | Gornick et al. | 382/103 |
| 2011/0169822 | A1 * | 7/2011 | Gardella et al. | 345/419 |
| 2011/0242074 | A1 * | 10/2011 | Bert et al. | 345/207 |
| 2012/0019684 | A1 * | 1/2012 | Yang et al. | 348/222.1 |

* cited by examiner

FOREIGN PATENT DOCUMENTS

| | | |
|---|---|---|
| EP | 1003326 A2 | 5/2000 |
| WO | WO 2007/127239 A2 | 11/2007 |

*Primary Examiner* — Javid A Amini
(74) *Attorney, Agent, or Firm* — Finnegan, Henderson, Farabow, Garrett & Dunner, L.L.P.

(57) ABSTRACT

Methods consistent with some embodiments presented provide methods for identifying at least one pixel in a raster image buffer for inclusion in a processing space. In some embodiments of methods identifying at least one pixel in a raster image buffer for inclusion in a processing space may include analyzing a tag-field associated with the at least one pixel. The tag-field may identify object types associated with the pixel. In some embodiments, an action directive may be assigned to the pixel based on the value of the tag-field. In some embodiments, the pixel may be included in a processing space based on the action directive.

25 Claims, 6 Drawing Sheets

SYSTEMS AND METHODS FOR OPTIMIZATION OF PIXEL-PROCESSING ALGORITHMS

BACKGROUND

1. Technical Field

The present embodiments relate to the field of printing and in particular, to systems and methods for optimizing pixel-processing algorithms.

2. Description of Related Art

High resolution printing systems may often use frame buffer enhancement techniques to improve print quality and, in particular, print resolution. Some enhancement techniques may include, among others, trapping, edge enhancement, and resolution enhacement. Trapping, for example, may be used to correct and/or mask visible effects of print engine misregistration. Trapping may be performed in a pixel-by-pixel manner by expanding or contracting coloring regions slightly in order to eliminate white gaps and/or colored edges between graphical objects. Edge enhancement may be used to modify the boundary of an object to be printed to achieve the impression of a sharper edge. Resolution enhancement may be used to provide resolution improvements by modifying the ink intensity at the boundary region of text characters.

Enhancement techniques can expend considerable computational resources. Some common pixel-based frame buffer enhancement algorithms may analyze all pixels in a frame buffer bitmap for a variety of conditions before modifying the pixels. In some cases, enhancement techniques may involve the analysis of pixels spanning multiple color planes. Typical frame buffer capacities in high resolution printing systems can range from 33 mega-bytes ("MB") to 512 MB. Accordingly, when frame buffer enhancement techniques are implemented in high resolution printing systems, the computational cost may be enormous because such frame buffers can have in the order of hundreds of millions of pixels.

Thus, there is a need for methods and systems to optimize pixel-based frame buffer enhancement processes for printing systems.

SUMMARY

Consistent with some embodiments, methods for identifying at least one pixel in a raster image buffer for inclusion in a processing space are presented. In some embodiments, a method for identifying at least one pixel in a raster image buffer for inclusion in a processing space comprises, analyzing a tag-field associated with the one pixel, wherein the tag-field identifies object types associated with the pixel; assigning an action directive to the pixel based on the value of the tag-field; and including the pixel in a processing space based on at least one of the value of the action directive.

Embodiments also relate to software, firmware, and program instructions created, stored, accessed, or modified by processors using computer-readable media or computer-readable memory. The methods described may be performed on a computer and/or a printing device.

These and other embodiments are further explained below with respect to the following figures.

DETAILED DESCRIPTION

Consistent with disclosed embodiments, methods for identifying at least one pixel in a raster image buffer for inclusion in a processing space are presented.

Figure 1:
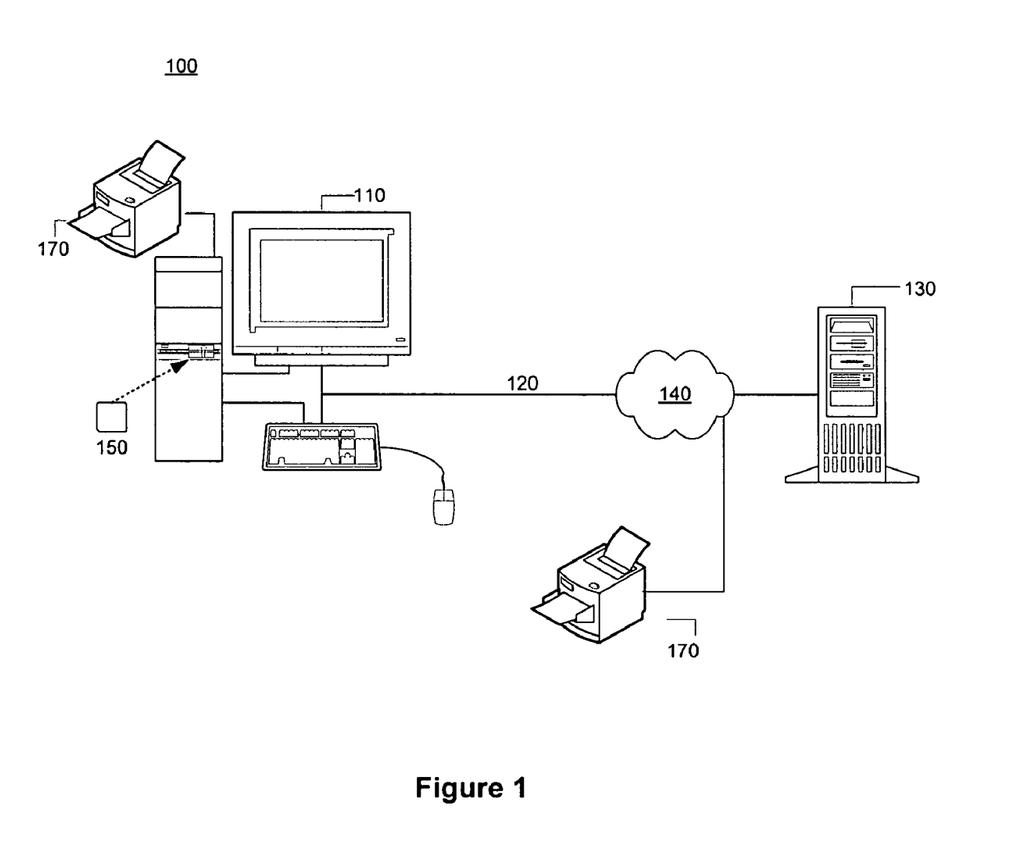
FIG. 1 shows a block diagram illustrating components in a system for printing documents consistent with disclosed embodiments.

FIG. 1 shows a block diagram illustrating components in an exemplary system for printing documents. An application for optimizing pixel processing algorithms using tag plane information may be deployed on a network of computers and printing devices, as shown in FIG. 1, that are connected through communication links that allow information to be exchanged using conventional communication protocols and/or data port interfaces.

As shown in FIG. 1, exemplary system 100 includes computers including computing device 110 and server 130. Further, computing device 110 and server 130 may communicate over connection 120, which may pass through network 140. Computing device 110 may be a computer workstation, desktop computer, laptop computer, or any other computing device capable of being used in a networked environment. Server 130 may be a platform capable of connecting to computing device 110 and other devices (not shown). Computing device 110 and server 130 may be capable of executing software (not shown) that allows the printing of documents using printers 170.

Document processing software running on computing device 110 and/or server 130 may allow users to view, edit, process, and store documents conveniently. Pages to print in a document may be described in a page description language ("PDL"). PDL's may include PostScript®, Adobe® PDF, HP PCL, Microsoft® XPS, and variants thereof. A PDL description of a document provides a high-level description of each page in a document. This PDL description is often translated to a series of lower-level printer-specific commands when the document is being printed.

In general, printer 170 may be any device that can be configured to produce physical documents from electronic data including, but not limited to, electro-photographic printers, such as laser printers and LED printers, ink-jet printers, thermal printers, laser imagers, and offset printers. Printer 170 may have an image transmitting/receiving function, an image scanning function, and/or a copying function, as installed in facsimile machines and digital copiers. Exemplary printer 170 may also be capable of directly printing documents received from computing device 110 or server 130 over connection 120. In some embodiments such an arrangement may allow for the direct printing of documents, with (or without) additional processing by computing device 110 or server 130. The processing of documents, which may contain one or more of text, graphics, and images, can be distributed. Thus, computing device 110, server 130, and/or the printer may perform portions of document print processing such as half-toning, color matching, and/or other manipulation processes before a document is physically printed by printer 170.

Computing device 110 also contains removable media drive 150. Removable media drive 150 may include, for example, 3.5 inch floppy drives, CD-ROM drives, DVD ROM drives, CD±RW or DVD±RW drives, USB flash drives, and/or any other removable media drives. Portions of applications may reside on removable media and be read by computing device 110 using removable media drive 150 prior to being acted upon by system 100.

Connection 120 couples computing device 110, server 130, and printer 170 and may be implemented as a wired or wireless connection using conventional communication protocols and/or data port interfaces. In general, connection 120 can be any communication channel that allows transmission of data between the devices. In one embodiment, for example, the devices may be provided with conventional data ports, such as parallel ports, serial ports, Ethernet, USB, SCSI, FireWire® and/or coaxial cable ports for transmission of data through the appropriate connection.

Network 140 could include a Local Area Network (LAN), a Wide Area Network (WAN), or the Internet. In some embodiments, information sent over network 140 may be encrypted to ensure the security of the data being transmitted. Printer 170 may be coupled to network 140 through connection 120. Exemplary printer 170 may also be connected directly to computing device 110 and/or server 130. System 100 may also include other peripheral devices (not shown). An application to optimize pixel-processing algorithms using tag plane information for print devices may be deployed on one or more of the exemplary computers or printers, as shown in FIG. 1. For example, computing device 110 could execute software that may be downloaded directly from server 130, and portions of the application may also be executed by exemplary printer 170.

Figure 2:
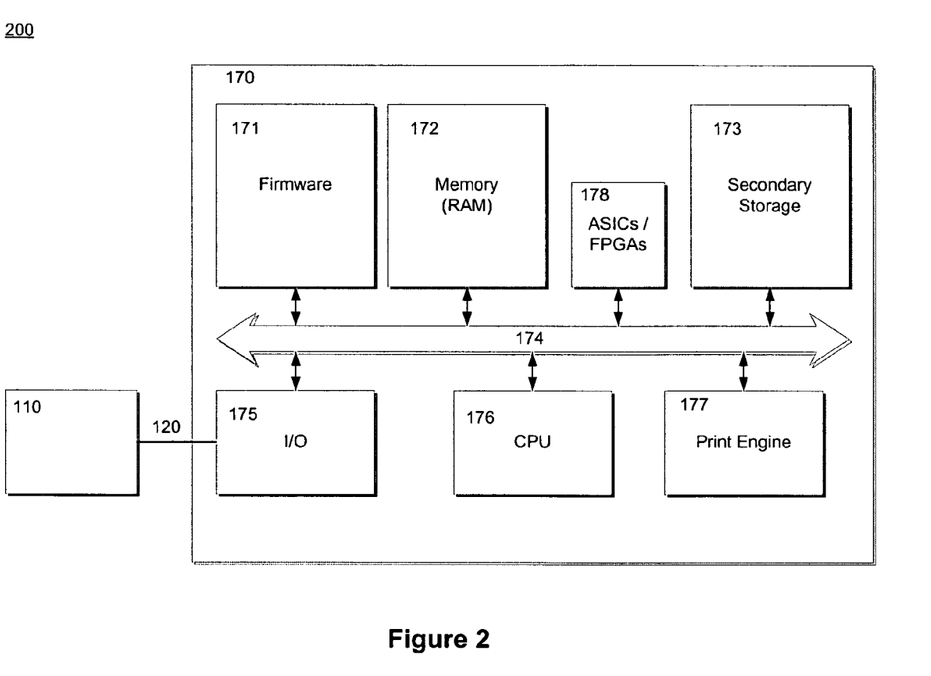
FIG. 2 shows a high-level block diagram of an exemplary printer consistent with disclosed embodiments.

FIG. 2 shows a high-level block diagram of a system 200 including exemplary printer 170. Exemplary printer 170 may include bus 174 that couples CPU 176, firmware 171, memory 172, input-output ports 175, print engine 177, and secondary storage device 173. Exemplary printer 170 may also include other Application Specific Integrated Circuits (ASICs), and/or Field Programmable Gate Arrays (FPGAs) 178 that are capable of executing portions of an application to print or process documents. Exemplary printer 170 may also be able to access secondary storage or other memory in computing device 110 using I/O ports 175 and connection 120. In some embodiments, printer 170 may also be capable of executing software including a printer operating system and other appropriate application software. Exemplary printer 170 may allow paper sizes, output trays, color selections, and print resolution, among other options, to be user-configurable.

Exemplary CPU 176 may be a general-purpose processor, a special purpose processor, or an embedded processor. CPU 176 can exchange data including control information and instructions with memory 172 and/or firmware 171. Memory 172 may be any type of Dynamic Random Access Memory ("DRAM") such as, but not limited to, SDRAM, or RDRAM. Firmware 171 may hold instructions and data including but not limited to a boot-up sequence, pre-defined routines including routines for, frame buffer bitmap processing, image processing, document processing, routines to generate tag plane information for use by pixel processing algorithms, and other code. In some embodiments, code and data in firmware 171 may be copied to memory 172 prior to being acted upon by CPU 176. Routines in firmware 171 may include code to translate page descriptions received from computing device 110 to display lists. In some embodiments, firmware 171 may include routines to optimize pixel-based frame buffer enhancements. Firmware 171 may also include compression routines, memory management routines, and rasterization routines to convert display list commands to an appropriate rasterized bit map. Data and instructions in firmware 171 may be upgradeable using one or more of computer 110, network 140, removable media coupled to printer 170, and/or secondary storage 173.

Exemplary CPU 176 may act upon instructions and data and provide control and data to ASICs/FPGAs 178 and print engine 177 to generate printed documents. ASICs/FPGAs 178 may also provide control and data to print engine 177. ASICs/FPGAs 178 may also implement one or more of translation, tag plane generation algorithms, frame buffer processing algorithms, compression, and rasterization algorithms.

In some embodiments, frame buffer processing algorithms, such as optimized pixel-processing algorithms, may be performed using ASIC/FPGA 178, CPU 176, or a combination thereof. In other embodiments, frame buffer bitmap algorithms may also be performed using software, firmware, hardware, or combination thereof.

Figure 3:
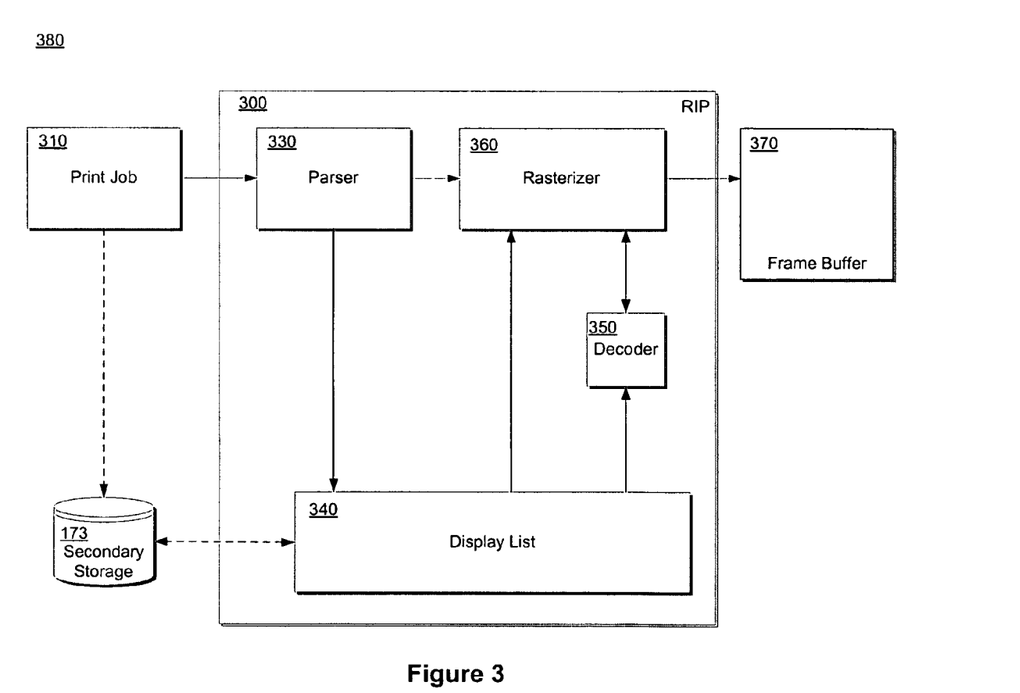
FIG. 3 shows an exemplary high-level data flow between modules in a system for rendering print data.

FIG. 3 shows an exemplary high-level data flow 380 between modules in a system for rendering print data. As shown in FIG. 3, the system comprises, inter alia, raster image processor (RIP) module 300, secondary storage 173, and frame buffer 370. RIP module 300 may be implemented as one of or a combination of hardware, software, and firmware. In some embodiments, RIP module 300 may comprise parser 330, decoder 350, and rasterizer 360. In some embodiments, parser 330, decoder 350, and rasterizer 360 may communicate with each other to exchange command, data, and synchronization information and may also create, modify, and perform other operations on display lists 340.

As shown in FIG. 3, parser 330 can receive print job 310 from computing device 110 and may use PDL language objects present in print job 310 to generate display lists 340. In some embodiments, display lists 340 may hold one or more of text, graphics, command, image header, and image data objects. These display commands may include data comprising characters or text, line drawings or vectors, and images or raster data. In some embodiments, objects in display lists 340 may correspond to similar objects in a user document. In some embodiments, display lists 340 may be stored in memory 172 or secondary storage 173. In some embodiments, display lists 340 may reside in one or more of printer 170, computing device 110, and server 130. Memory to store display lists 340 may be a dedicated memory or form part of general purpose memory, or some combination thereof according to disclosed embodiments. Display lists 340 may be a second or intermediate step in the processing of data prior to actual printing and may be parsed before conversion into a subsequent form. In some embodiments the subsequent form may be a final representation.

In some embodiments, RIP module 300 may be implemented as a software application, or in firmware 171 using CPU 176; or using ASIC/FPGA 178, or by some combination thereof. RIP module 300 can receive and operate on data in print job 310 to facilitate the generation of frame buffer 370. In some embodiments, print job 310 may comprise a sequence of drawing commands and language objects. The sequence may include drawing commands associated with text objects, image objects, and/or graphics objects. In some embodiments, the images corresponding to image objects in print job 310 may comprise high-resolution images. High resolution images may be defined by high calorimetric and spatial resolution. Colorimetric resolution may refer to the ability of a printer to accurately reproduce the color of an image pixel using a particular color space. Colorimetric resolution is often a function of the number of bits used to represent a pixel. For example, a pixel with 8-bits of information per color plane in a color space using cyan, magenta, yellow, and black color planes can represent a larger range of colors than a representation in the same color space that uses 6-bits of information per color plane. A printer may use a pattern of several dots of various colors, shades, and intensities, to reproduce the color of each image pixel. Spatial resolution may refer to a measure of how closely lines in an image can be resolved. That is, spatial resolution may refer to the number of independent pixel values per unit length.

In some embodiments, the images corresponding to image objects in print job 310 may be compressed using common compression algorithms, including but not limited to JPEG, GIF, TIFF, and/or PNG. In some embodiments, the images corresponding to image objects associated with print job 310 may be stored in secondary storage 173. In other embodiments, images corresponding to image objects associated with print job 310 may be stored on other computer readable storage media coupled to computing device 110 or printer 170 (not shown) either alone or in combination with secondary storage 173.

In some embodiments, processing print job 310 by parser 330 may comprise placing drawing commands associated with text and graphics directly into display lists 340 based on a PDL definition associated with print job 310. In cases where print job 310 contains images, parser 330 can place an image header or some other descriptive reference corresponding to the image object in display list 340. In some embodiments, images in the print job may continue to remain in compressed form in memory 172 or in secondary storage 173.

In some embodiments, decoder 350 can use image header or other image identification information in display lists 340 to translate print data into low-level instructions based on the page description language being processed. For example, to decompress images included in display lists 340, decoder 350 can request the retrieval of compressed images from secondary storage 173 using information present in the reference to image objects in display lists 340. In some embodiments, decoder 350 can then decompress the compressed image.

In some embodiments, the reconstruction of the uncompressed image may proceed scan line by scan line in order from top to bottom. A scan line may be described as a 1×N array of pixels, where N may represent a first integer value. In some situations, a scan line may additionally be described as 1 to D planes deep. Here, D may represent a second integer value. For example, when image data consists of information in D color planes, the scan line may include 1 line of data comprising of N pixels for each of the D color planes. Decoder 350 may receive a pointer to a read function to access an image from secondary storage 173. In some embodiments, the read function may be system specific. Decoder 350 may also output scan lines for reconstructing the decompressed image. In some embodiments, decoder 350 may be implemented in one of hardware, software, or some combination thereof. For example, decoder 350 may be implemented in firmware 171, CPU 176, ASIC/FPGA 178, or some combination thereof.

In some embodiments, rasterizer 360 can read data and drawing commands from display lists 340 and decompressed scan lines from decoder 350, and store its output in frame buffer 370. In some embodiments, frame buffer 370 may be part of memory 172. In some embodiments, data in frame buffer 370 may be organized as discrete horizontal bands to optimize processing. Frame buffer 370 may hold a rectangular bitmap, comprised of individual pixels, specifying the marks to be made on a printed page for print job 310. Print engine 177, may process the rasterized data in frame buffer 370, and form a printable image of the page on a print medium, such as paper. In some embodiments, processing rasterized data may include analyzing a tag plane associated with each individual pixel of frame buffer 370. Tag plane 410, as described in greater detail in reference to FIG. 4, may include data about the pixel, such as whether the pixel is associated with a text, an image, or a graphic object type. In some embodiments, routines for rasterizer 360 may be provided in firmware 171 or may be implemented using ASICs/FPGAs 178.

Figure 4:
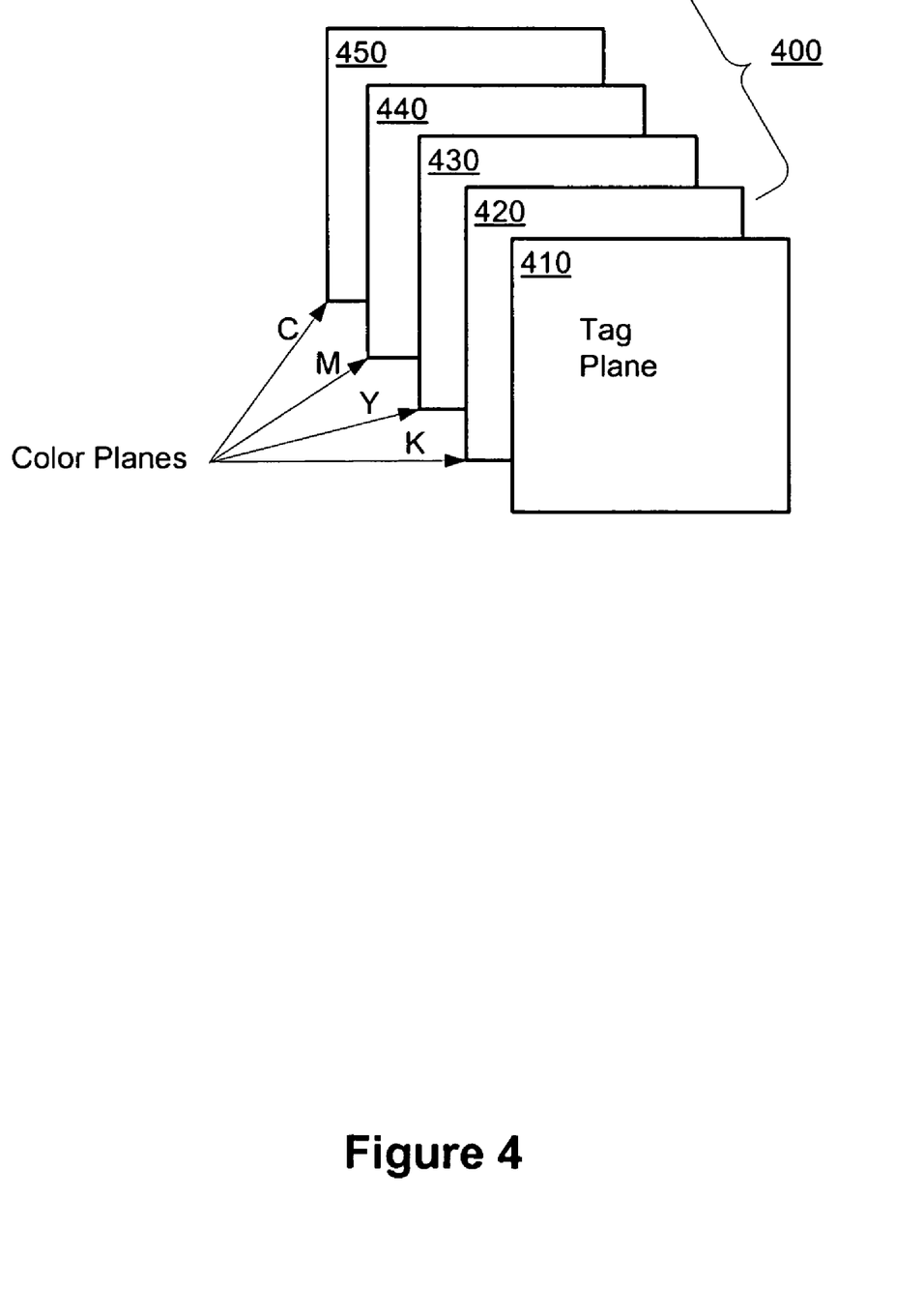
FIG. 4 illustrates the correspondence between an exemplary pixel in a frame buffer and a tag plane consistent with disclosed embodiments.

FIG. 4 illustrates the correspondence between exemplary pixel 400 in a frame buffer and tag plane 410 consistent with disclosed embodiments. Exemplary pixel 400 may include a combination of colors of one or more color planes associated with the color space of printer 170. For example, in a color space that uses cyan, magenta, yellow, and black ("CMYK"), each pixel may be reproduced using a pattern of several dots of C, M, Y, or K, in varying intensities. The specific combination of colors for a pixel may be stored in frame buffer 370. In some embodiments, for a given pixel, each color component may be represented as a plurality of bit values. For example, an 8-bit value may be used to represent the tonal variations in each color plane.

As shown in FIG. 4, tag plane 410 may be stored as a separate plane. Tag plane 410 can provide information pertaining to each pixel that can be used to correlate pixel information with object types associated with the pixels.

Tag plane 410 may be comprised of plurality of tag-fields, where each tag-field may be associated with a unique pixel. In some embodiments, there may be a one-to-one correspondence between tag-fields and pixels. Each tag-field may further comprise a plurality of tag bits, where each tag bit can represent a particular object type associated with the pixel. For example, tag plane 410 may be comprised of tag-fields comprising three bits. The three bits may represent three different object types such as text, image, and graphic, as shown in Table 1 below. In some embodiments, the size of the tag-field may be greater or less than three bits based on considerations such as the memory structure of frame buffer 370, word sizes used by CPU 176, and/or speed and efficiency considerations.

Tag plane 410 may be generated by RIP module 300 based on information derived from the PDL description of the document page. In some embodiments, tag plane 410 may be generated by decoder 350 in conjunction with the rasterization of a page. For example, a particular page may contain multiple objects. In some cases, the objects on the page may overlap or be in close proximity to one another. The information in the tag-field for a pixel associated with these objects can be used to track the various object types associated with the pixel. In cases where overlapping objects are of different types, such as a text object that is placed on top of an image or graphic object, the tag-field for pixels that are related to objects of more than one type can reflect the fact that multiple object types are associated with the pixels. Accordingly, a tag-field in tag plane 410 associated with a pixel in an overlap region may change as various object types in display lists 340 associated with that pixel are rasterized and stored in frame buffer 370. In other words, the tag-field associated with a pixel may permit representation of the cumulative history of the object types associated with the pixel.

Changes to object types associated with a pixel may be registered in tag plane 410 by changing appropriate tag bits in the tag-field associated with the pixel. For example, each tag bit may represent a particular object type. For example, a first object of type text may be retrieved from display list indicating text for a particular page region. When the text object is processed, information in tag-fields associated with pixels corresponding to the text object may be changed by changing a bit associated with text object types in the tag-field. Subsequently, further processing of display lists 340 may yield objects of other types, such as an image object corresponding to one or more of the pixels previously associated with the text object. Accordingly, when the image object is processed, information in tag-fields associated with pixels corresponding to the image object may be changed by changing a bit associated with image object types in the tag-field. Thus, some pixels, which are associated with both the text and image object types, may have two tag bits set to indicate the dual association with text and image object types. In general, pixels associated with one or more object types may have tag bits set, or may be otherwise marked, to indicate their association with the object types. Furthermore, in some embodiments, bits may not be overwritten during processing. Accordingly, the tag-field can represent a cumulative history of object type associations (T,G,I) for each pixel.

In general, tag-fields in tag plane 410 may be unmarked, single-marked, or multi-marked. An unmarked tag-field in tag plane 410 may contain logical zero values in tag-fields for each tag bit corresponding to a particular object type. A single marked tag-field may include only one active tag bit. In some cases, an active bit may be indicated as a logical one. A multi-marked tag-field in tag plane 410 may include a plurality of active tag bits. In some embodiments, tag plane 410 may be stored along with frame buffer 370 and/or stored in memory 172. In other embodiments, tag plane 410 may be stored in secondary storage 173, or using other processor readable memory accessible by RIP module 300.

Figure 5:
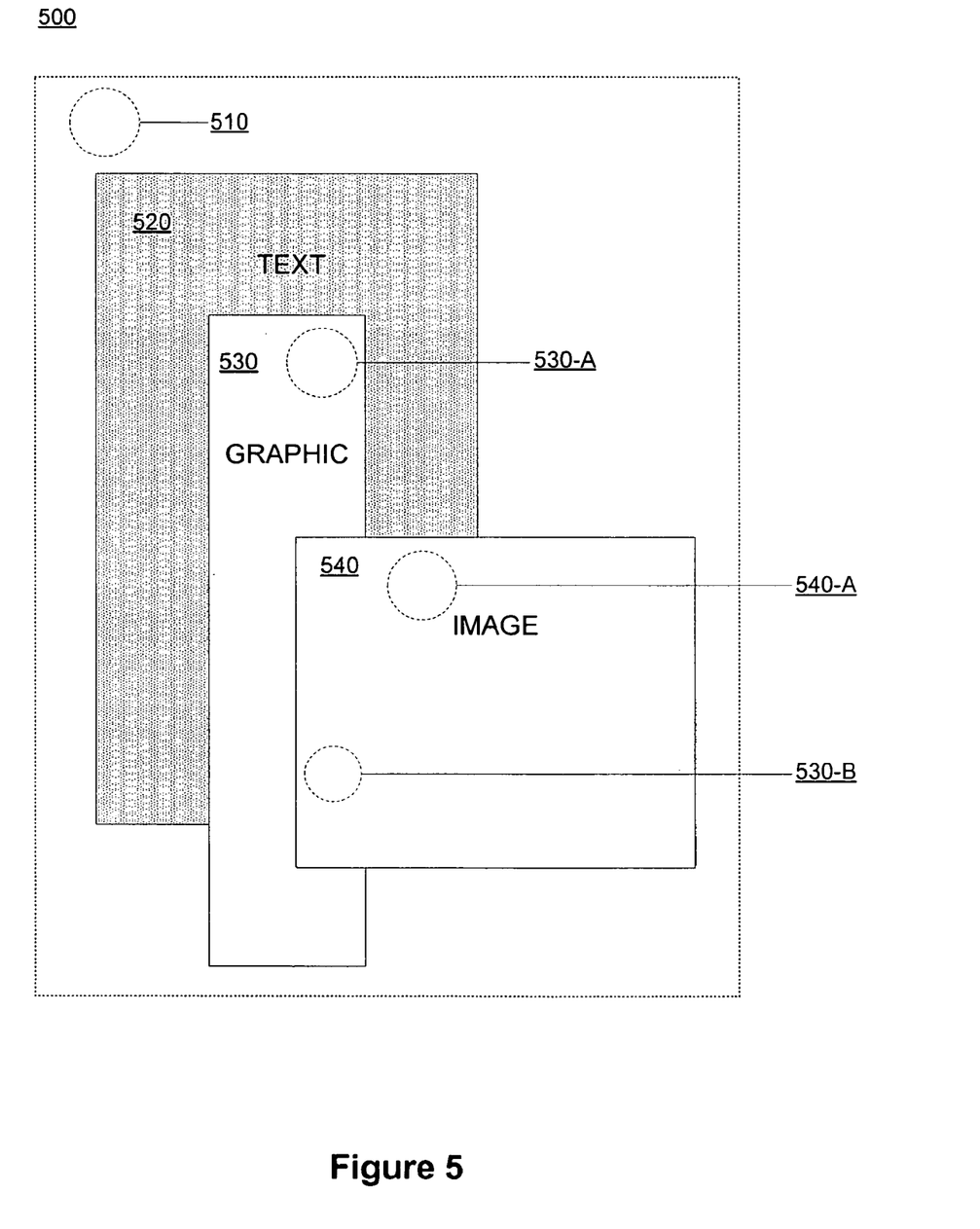
FIG. 5 shows a snapshot of an exemplary page consistent with disclosed embodiments.

FIG. 5 shows a snapshot of an exemplary page 500 showing page regions with multiple objects. Page 500 may include one or more pixels associated with object types identified by bits in tag-fields in tag plane 410. For example, as shown in FIG. 5, page 500 comprises unmarked area 510, text area 520, image area 540, and graphic area 530. Note that the areas may overlap with each other. For example, region 530-A indicates a page region with overlapping text and graphic objects. Here, bit 0 may represent a text object type, bit 1 may represent a graphic object type, and bit 2 may represent an image object type. Thus, the bit code associated with region 530-A may be represented by [110]. Similarly, region 540-A and region 530-B may be represented by tag-field values [101] and [111], indicating page areas of overlapping text and image and overlapping text, image, and graphic, respectively.

Table 1 shows a decision table illustrating the relationship between tag-fields in an exemplary tag plane, tags associated with each pixel, and algorithm-specific action directives based on the tag-field value associated with each pixel.

TABLE 1

| | Tag Plane | | | | Algorithms | | |
|---|---|---|---|---|---|---|---|
| Row | T | G | I | Definition | Action Directive I | Action Directive II | Action Directive III |
| 1 | 0 | 0 | 0 | all empty | 0 | 0 | 0 |
| 2 | 1 | 0 | 0 | only text | 0 | 0 | 1 |
| 3 | 0 | 1 | 0 | only graphics | 0 | 0 | 0 |
| 4 | 0 | 0 | 1 | only image | 0 | 0 | 0 |
| 5 | 1 | 1 | 0 | text & graphic | 1 | 1 | 1 |
| 6 | 0 | 1 | 1 | graphic & image | 0 | 1 | 0 |
| 7 | 1 | 0 | 1 | text & image | 0 | 1 | 1 |
| 8 | 1 | 1 | 1 | all 3 | 1 | 1 | 1 |

Listed in the first primary column on the left, labeled tag plane, are bit codes representing combinations of tag bits associated with a particular pixel. Here, tag bits correspond to text object type T, graphic object type G, and image object type I. Each tag bit may be encoded as a single bit with a value of 0, (unmarked), indicating that no object types have been associated with the pixel. Alternatively, the tag bit may have a value of 1, or marked, indicating the occurrence of a particular object type associated with the pixel. For example, row 1 of Table 1 lists 0 for each tag bit indicating the absence of a text, image, or graphic object type associated with the pixel. Row 1, thus corresponds to an unmarked pixel. Row 2, shows a pixel associated with a text object type having a set, or active tag bit, corresponding to the text object type T. Thus, row 2 corresponds to a singly marked pixel. In row 8, three bits corresponding to text, graphic, and image object types, respectively, are all active indicating that the pixel is associated with all three object types. Row 8 corresponds to a multiply marked pixel.

In the next column, a "definition" of the corresponding combination of tag bits, or tag-field value, is provided. The definition is shown for illustrative purposes only. The definition is illustrative of the interpretation that an algorithm processing the tag-field may place on the value of the tag-field. For example, the tag-field value associated with row 1 of Table 1 has been shown as "all empty", indicating that for algorithms I, II, and III, no object types have been associated with the pixel.

The next columns in Table 1 describe algorithm-specific action directives for a specific algorithm that subsequently uses the tag-field value associated with each pixel. Examples of algorithms may include variants of trapping, edge enhancement, or resolution enhancement. In some embodiments, the action directive provides a clear directive to a subsequent pixel processing algorithm whether a pixel should (or should not) be included as a candidate in the processing space for any processing operations performed by the algorithm.

For example, a trapping algorithm may be used to correct and/or mask visible effects of print engine misregistration. An action directive associated with a trapping algorithm, would likely operate on multiply-marked pixels, such pixels marked as text and graphic, rather than unmarked pixels. For example, Action Directive I, shown in Table 1, may pertain to a trapping algorithm. As illustrated in row 1 of Table 1, Action Directive I is "0" when a pixel has a tag-field value of [000], indicating "all empty." Thus, a pixel with a tag-field value of [000] is not a likely candidate for further processing applying the trapping algorithm based on Action Directive I. Similarly, a second algorithm may be a modified trapping algorithm, which may include performing trapping on pixels marked as graphic and image in addition to pixels marked as text and graphic. For, example Action Directive II, as shown in Table 1, may pertain to a modified trapping algorithm. As illustrated in row 6 of Table 1, Action Directive II is "1" when a pixel has a tag-field value of [011], indicating "graphic and image."

Thus, a pixel with a tag-field value of [011] may be a candidate for further processing applying a modified trapping algorithm based on the value of Action Directive II. Finally, a third algorithm may be a resolution enhancement algorithm. Some resolution enhancement algorithms, for example, may focus on text characters. Action Directive III, as shown in Table 1, may pertain to this type of resolution enhancement algorithm. As illustrated in row 2 of Table 1, Action Directive III is "1" when a pixel has a tag-field value of [100], indicating "only text." Thus, a pixel with a tag-field value of [100] may be a candidate for further processing applying resolution enhancement algorithm based on Action Directive III.

In some embodiments, the value corresponding to the action directive may be encoded as a plurality of bits and stored along with the associated tag-field value. For example, in some embodiments, a tag-field value may be stored as a four-bit value in a eight bit memory location, or two four-bit values for two tag-fields may be compacted and stored as a byte in one eight bit memory location.

Figure 6:
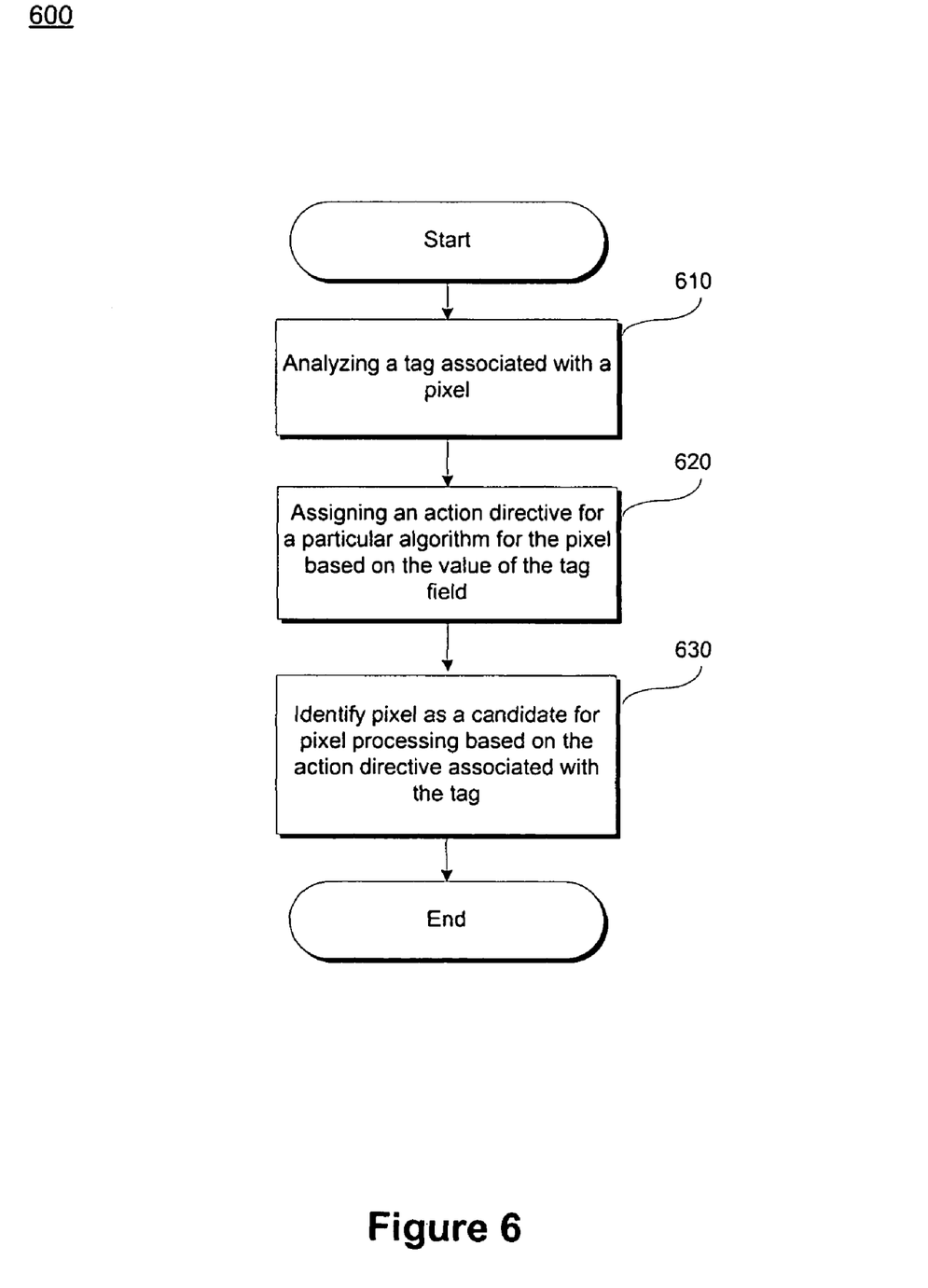
FIG. 6 shows an exemplary flowchart illustrating steps in a method for identifying at least one pixel in a raster image buffer for inclusion in a processing space.

FIG. 6 shows exemplary flowchart 600 illustrating steps in a method for identifying at least one pixel in a raster image buffer for inclusion in a processing space consistent with disclosed embodiments. It will be readily appreciated by one having ordinary skill in the art that the illustrated procedure can be altered to delete steps, move steps, or further include additional steps.

In step 610, the tag plane associated with a pixel may be analyzed. For example, tag-fields in tag plane 410 may be analyzed prior to performing certain pixel-based enhancement algorithms, such as trapping, edge enhancement, or resolution enhancement. A trapping algorithm, for example, may be used to correct and/or mask visible effects of print engine misregistration. Trapping algorithms may be performed by expanding or contracting coloring regions slightly in order to eliminate white gaps and/or colored edges between graphical objects. An edge enhancement algorithm may be used to modify the boundary of an object to be printed to achieve the impression of a sharper edge. A resolution enhancement algorithm may be used to provide resolution improvements by modifying the ink intensity at the boundary region of text characters. In some embodiments, information in tag-fields in tag plane 410 may be used to determine the object-associations of a particular pixel, in order to determine if that pixel may suitable for inclusion as a candidate in the processing space for pixel-based optimization algorithm. For example, as shown in row 1 of Table 1 above, a tag-field value of [000] may indicate a page area comprised of unmarked pixels, which may not be a candidate for additional processing. In contrast, as shown in row 8 of Table 1, a tag-field value of [111] may indicate a pixel associated with text, image, and graphic object types, which may have a greater likelihood of being used further by downstream pixel processing algorithms. In some embodiments, tag-fields may be updated using a logical 'OR' function, thus preventing bit values that may have been set earlier from being overwritten. Further, an action directive may be directly derived from the values of the tag bits associated with a pixel.

In some embodiments, a processing space can be determined based on tag-field values in the tag plane. For example, the value of a tag-field may be used to eliminate (or include) a particular pixel from a processing space, where the processing space includes pixels that are candidates for further processing. A tag-field may indicate whether a pixel includes zero or more object types during the rasterization process. Any pixels associated with overlapping objects or different objects in close proximity to each other may be marked as candidates for processing using one or more bits in the tag-field. As noted above, the tag-field values may indicate an action directive, which can provide a basis for subsequent actions. Accordingly, tag-field values in tag plane 410 may be utilized to narrow and optimize a processing space for subsequent processing.

In step 620, an algorithm-specific action directive may be assigned to the pixel based on the value of the tag-field. For example, as shown in row 5 of Table 1, a particular pixel may have a tag-field value [110]. The tag-field value of [110] indicates that the associated pixel was rasterized as a text object type and a graphic object type, as indicated by marked tag bits T and G and unmarked tag bit 1. The corresponding tag-field value definition of [110] corresponds to "text & graphic." In other words, a [110] tag-field value indicates that the corresponding pixel has object types text and graphics, and may therefore be a candidate for further processing.

The nature of downstream processing may be defined based on the action directive, which may be algorithm-specific. For example, as shown in row 6 of Table 1, a tag-field value of [011] may be interpreted by Action Directive I and Action Directive III as "0" (suggesting non-inclusion in their respective processing spaces) and by Action Directive II as "1" (suggesting inclusion in its processing space). As shown in Table 1, "1" may provide an indication to a subsequent pixel processing algorithm associated with Action Directive II that a pixel should be included as a candidate in any processing operations performed by the algorithm. In contrast, "0" may provide and indication to subsequent pixel processing algorithms associated with Action Directive I and Action Directive III that a pixel should not be included as a candidate in any processing operations performed by the respective algorithms. In some embodiments, the algorithm-specific action directive may be specified on user-defined criteria, such as computing or memory resources available to perform the specific action directive.

In step 630, a pixel may be included in a processing space based on the value of the algorithm-specific action directive. For example, for a pixel having a tag-field value of [110], as described in row 5 of Table 1, may be included in a processing space for a trapping algorithm, corresponding Action Directive I. In another embodiment, another algorithm may use a different action directive to determine whether to include the pixel in its processing space. A modified trapping algorithm, with the additional request to process image pixels, would follow Action Directive II. A resolution enhancement algorithm focusing on text characters may be guided by Action Directive III. In some embodiments, the processing space may include one of a trapping process, an edge enhancement process, or a resolution enhancement process.

In some embodiments, a program for conducting the above process can be recorded on computer-readable media 150 or computer-readable memory. These include, but are not limited to, Read Only Memory (ROM), Programmable Read Only Memory (PROM), Flash Memory, Non-Volatile Random Access Memory (NVRAM), or digital memory cards, such as secure digital (SD) memory cards, Compact Flash™, Smart Media™, Memory Stick™, and the like. In some embodiments, one or more types of computer-readable media may be coupled to printer 170. In certain embodiments, portions of a program to implement the systems, methods, and structures disclosed may be delivered over network 140.

Other embodiments will be apparent to those skilled in the art from consideration of the specification and practice of one or more embodiments of the disclosed herein. It is intended that the specification and examples be considered as exemplary only, with a true scope and spirit of the embodiments being indicated by the following claims.

What is claimed is:

1. A method for identifying at least one pixel in a raster image buffer for inclusion in a processing space, the method comprising:

analyzing a tag-field associated with the at least one pixel, wherein the tag-field identifies object types associated with the pixel;

assigning an algorithm-specific action directive to the pixel based on a value of the tag-field, wherein a plurality of tag-fields are stored within a tag plane, each tag-field from the plurality of tag-fields corresponding to one or more algorithm-specific action directives, each of the one or more algorithm-specific action directives corresponding to one or more object types, the value of the tag-field indicating the corresponding one or more algorithm specific action directives to assign; and including the pixel in the processing space based on at least one of the values of the action directive.

2. The method of claim 1, wherein the tag plane comprises an aggregation of tag-fields for pixels in the raster image buffer.

3. The method of claim 1, wherein the tag-field comprises a plurality of bits corresponding to the object types associated with the pixel.

4. The method of claim 1, wherein the object types associated with the pixel comprise at least one of text, graphic, or image.

5. The method of claim 1, wherein the processing space comprises at least one of single-type marked or multi-type marked tag-fields.

6. The method of claim 5, wherein the single-type marked tag-field includes pixels with one active tag-field bit.

7. The method of claim 5, wherein the multi-type marked tag-field includes pixels with a plurality of active tag-field bits.

8. The method of claim 1, wherein the processing space corresponds to the processing space of at least one of a trapping process, an edge enhancement process, or a resolution enhancement process.

9. The method of claim 1, wherein the pixel is included in the processing space if the action probability exceeds a threshold value.

10. A non-transitory computer-readable medium that stores instructions, which when executed by a processor perform steps in a method for identifying at least one pixel in a raster image buffer for inclusion in a processing space, the method comprising:

analyzing a tag-field associated with the at least one pixel, wherein the tag-field identifies object types associated with the pixel;

assigning an action directive to the pixel based on a value of the tag-field, wherein a plurality of tag-fields are stored within a tag plane, each tag-field from the plurality of tag-fields corresponding to one or more algorithm-specific action directives, each of the one or more algorithm-specific action directives corresponding to one or more object types, the value of the tag-field indicating the corresponding one or more algorithm specific action directives to assign; and including the pixel in the processing space based on at least one of the values of the action directive.

11. The computer-readable medium of claim 10, wherein the tag-field corresponding to the pixel is stored in a tag plane, wherein the tag plane comprises an aggregation of tag-fields for pixels in the raster image buffer.

12. The computer-readable medium of claim 10, wherein the tag-field comprises a plurality of bits corresponding to the object types associated with the pixel.

13. The computer-readable medium of claim 10, wherein the object types associated with the pixel comprise at least one of text, graphic, or image.

14. The computer-readable medium of claim 10, wherein the processing space comprises at least one of single-type marked or multi-type marked tag-fields.

15. The computer-readable medium of claim 14, wherein the single-type marked tag-field includes pixels with one active tag-field bit.

16. The computer-readable medium of claim 14, wherein the multi-type marked tag-field includes pixels with a plurality of active tag-field bits.

17. The computer-readable medium of claim 10, wherein the processing space corresponds to the processing space of at least one of a trapping process, an edge enhancement process, or a resolution enhancement process.

18. The computer-readable medium of claim 10, wherein the pixel is included in the processing space if the action probability exceeds a threshold value.

19. A method for tagging at least one pixel in a raster image buffer, the method comprising:

providing at least one tag-field associated with the at least one pixel, the at least one tag-field stored in a tag plane, wherein a plurality of tag fields are stored within a tag plane, each tag-field from the plurality of tag-fields corresponding to one or more algorithm-specific action directives, each of the one or more algorithm-specific action directives corresponding to one or more object types, a value of the tag-field indicating the corresponding one or more algorithm specific action directives to assign to the at least one pixel;

analyzing object types associated with the at least one pixel; and determining, based on the analysis, the tag-field value to reflect object types associated with the at least one pixel.

20. The method of claim 19, wherein the tag-field value of pixels in the raster image buffer are aggregated in a tag plane.

21. The method of claim 19, wherein the tag-field comprises a plurality of bits, wherein each bit represents a distinct object type associated with the at least one pixel.

22. The method of claim 19, wherein the tag-field comprises a plurality of bits, wherein each bit represents a distinct object type associated with the at least one pixel.

23. The method of claim 1, wherein the value of the tag-field represents a cumulative history of the object types associated with the pixel in a case where a plurality of objects of different object types overlap at the pixel.

24. The computer-readable medium of claim 10, wherein the value of the tag-field represents a cumulative history of the object types associated with the pixel in a case where a plurality of objects of different object types overlap at the pixel.

25. The method of claim 19, wherein the value of the tag-field represents a cumulative history of the object types associated with the pixel in a case where a plurality of objects of different object types overlap at the pixel.

* * * * *